(12) United States Patent  (10) Patent No.: US 8,780,535 B2
Mongan et al.  (45) Date of Patent: Jul. 15, 2014

(54) CASE FOR ENCLOSING AND REMAINING ATTACHED TO A TABLET-COMPUTING DEVICE

(75) Inventors: Ryan Hill Mongan, Orange, CA (US); Bryan Lee Hynecek, Fremont, CA (US); David John Law, Seattle, WA (US); Jarret Weis, San Francisco, CA (US)

(73) Assignee: Speculative Product Design, LLC, Mountain View, CA (US)

( * ) Notice: Subject to any disclaimer, the term of this patent is extended or adjusted under 35 U.S.C. 154(b) by 37 days.

(21) Appl. No.: 13/215,878

(22) Filed: Aug. 23, 2011

(65) Prior Publication Data

US 2012/0044638 A1    Feb. 23, 2012

Related U.S. Application Data

(60) Provisional application No. 61/401,908, filed on Aug. 23, 2010.

(51) Int. Cl.
*G06F 1/16* (2006.01)
*A45C 11/00* (2006.01)

(52) U.S. Cl.
CPC ......... *A45C 11/00* (2013.01); *G06F 2200/1633* (2013.01); *A45C 2200/15* (2013.01); *A45C 2011/003* (2013.01)
USPC ....... 361/679.01; 248/611; 206/232; 345/156

(58) Field of Classification Search
USPC .......... 248/121, 286.1, 157, 688, 278.1, 611; 206/45.25, 45.24, 778, 320, 449, 232, 206/521.1, 216; 361/679.08, 679.54, 361/679.01, 679.28, 679.17, 679.55, 361/679.41, 679.02, 679.27, 679.23; 312/323, 293.1, 237, 319.2, 223.1, 312/223.2, 334.46; 345/501, 173, 589, 545, 345/156, 633, 649
See application file for complete search history.

(56) References Cited

U.S. PATENT DOCUMENTS 7,281,877 B1    10/2007  Lederer et al.
2004/0075282 A1  4/2004  Silverman et al.
(Continued)

FOREIGN PATENT DOCUMENTS

CN    201 153 646        11/2008
DE    20 2008 002161      7/2008
WO    WO 2010/036090     4/2010

OTHER PUBLICATIONS

International Search Report and Written Opinion dated Mar. 26, 2012 in related International Application No. PCTUS2011/048694.

(Continued)

*Primary Examiner* — Hung Duong
(74) *Attorney, Agent, or Firm* — Frommer Lawrence & Haug LLP

(57) ABSTRACT

A case for enclosing and remaining attached to a tablet-computing device may include a rigid inner portion and an outer portion attached thereto. The case may be customized to accommodate a particular kind or type of tablet-computing device and may include an aperture aligned within the case to accommodate a feature of the inserted tablet-computing device. The case may be configured to elevate a tablet-computing device to an angled position relative to a planar position and/or maintain the tablet-computing device in the angled position. In some embodiments, the rigid inner portion may be removable from the case.

8 Claims, 5 Drawing Sheets

(56) References Cited

U.S. PATENT DOCUMENTS

| | | |
|---|---|---|
| 2004/0173482 A1 | 9/2004 | Nieves |
| 2006/0285283 A1 | 12/2006 | Simonian et al. |
| 2007/0001079 A1 | 1/2007 | Patterson, Jr. |
| 2007/0211415 A1 | 9/2007 | Seo et al. |
| 2007/0232109 A1 | 10/2007 | Parker et al. |
| 2008/0192424 A1 | 8/2008 | Lee |
| 2009/0009945 A1 | 1/2009 | Johnson et al. |
| 2010/0001163 A1 | 1/2010 | Takizawa |
| 2010/0101975 A1 | 4/2010 | Zhang et al. |
| 2010/0122924 A1 | 5/2010 | Andrews |
| 2011/0228459 A1* | 9/2011 | Richardson et al. ..... 361/679.01 |
| 2012/0211377 A1* | 8/2012 | Sajid .............................. 206/216 |
| 2013/0098782 A1* | 4/2013 | Diebel et al. ............... 206/45.25 |

OTHER PUBLICATIONS

Extended Search report dated Dec. 18, 2013 for EP 11 82 0478.3.
Amazon: "Apple iPad Case (Case-ZMILMC361ZM/b)". Mar. 15, 2010, pp. 1-5, XP002634625.

* cited by examiner

CASE FOR ENCLOSING AND REMAINING ATTACHED TO A TABLET-COMPUTING DEVICE

RELATED APPLICATION

This application is a NONPROVISIONAL of, claims priority to, and incorporates by reference U.S. Provisional Patent Application 61/401,908 filed 23 Aug. 2010.

FIELD OF THE INVENTION

The present invention relates to a case for enclosing and remaining attached to a tablet-computing device.

BACKGROUND

Cases for tablet-computing devices have been available for some time. They are most commonly used to protect the device and allow the user some amount of personalization. Typically these cases have been fabricated from a soft flexible material like leather, synthetic leather, or a polymer based fabric (e.g. nylon, polyester, or polymer coated cotton). The functional advantage of the flexible materials is that they can accommodate a hinge without a separate part. The material itself flexes accomplishing the opening and closing action. Sometimes the flexible material is incorporated with a rigid or semi-rigid insert. This allows some portions to be stiff while still having the hinging properties in other regions—similar to a hard back book.

SUMMARY

A case for enclosing and remaining attached to a tablet-computing device including a rigid inner portion and an outer portion attached thereto is herein provided. In some embodiments, the case may be customized to accommodate a particular kind or type of tablet-computing device and the case may include an aperture aligned within the case to accommodate a feature of an inserted tablet-computing device.

The rigid inner portion may comprise, for example, a plastic, a metal, an elastomeric material, a hard rubber material, wood, a composite material, and some combination thereof. The outer portion may comprise, for example, plastic, rubber, fabric, leather, cardboard, metal, and/or some combination thereof.

The rigid inner portion may be shaped to accept and retain an inserted tablet-computing device. On some occasions, the rigid inner portion may include a cut away portion or opening sized and positioned to accommodate a feature of the inserted tablet-computing device, such as, but not limited to, a user interface and a port. In at least one embodiment, the rigid inner portion may be removably attached to the outer portion of the case.

The outer portion of the case may be attached to the rigid inner portion and include at least two sections. The first section may be attached to and shaped to cover a backside of the rigid inner portion. The second section may be shaped to cover the inserted tablet-computing device and connected to the first section via a flexible junction via, for example, a hinge or a fold in the outer portion of the case.

In one embodiment, the rigid inner portion may be attached to the first section of the case via a flexible junction, the second section of the case may include a retaining mechanism, and the rigid inner portion may include an attachment mechanism for attaching to retaining mechanism such that the tablet-computing device is elevated at an angled position relative to a planar position and/or maintained in the angled position.

In another embodiment, the outer portion may include a third section connected to the first section via a flexible junction. The third section may include retaining mechanism and the first section may include an attachment mechanism for attaching to the retaining mechanism such that the tablet-computing device is elevated at an angled position relative to a planar position and/or maintained in the angled position.

BRIEF DESCRIPTION OF THE DRAWINGS

The present application is illustrated by way of example, and not limitation, in the figures of the accompanying drawings, in which:

FIG. 3C is a top view of an outer portion of an exemplary case in accordance with embodiments of the present invention;

FIG. 3B is a side view of an exemplary outer portion of an exemplary case in accordance with embodiments of the present invention; and FIGS. 4A-5B illustrate exemplary cases elevated to an angled position in accordance with embodiments of the present invention.

Figure 1A:
FIG. 1A is top view an exemplary rigid inner portion in accordance with embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

WRITTEN DESCRIPTION

At times it may desirable to combine the features of a rigid case and a fold-over case for enclosing and/or protecting a tablet-computing device. Exemplary tablet-computing devices include a mobile communication device, an iPad™, a Kindle™ as distributed by Amazon, and a Nook™ as distributed by Barnes and Noble.

One exemplary case described herein includes two parts: a cover and a rigid inner portion or chassis. The rigid inner portion may be an interface between a tablet-computing device and the rest of the case. In some cases, the rigid inner portion may attach and/or snap onto the tablet-computing device. In other cases, the rigid inner portion may be attached to the case via hardware or utilize multiple chassis pieces that attach to each other and thereby encapsulate the tablet-computing device. In some embodiments, the rigid inner portion may be a planar object with multiple hinges and protect the tablet-computing device when not in use by wrapping around it. Traditionally, when a cover such as this is used with a tablet-computing device, the cover provides no functionality when the tablet-computing device is in use. These covers are folded back around the back of the unit so as to be as unobtrusive as possible. The case described has additional functionality as there are details in the cover that allow the user to position the tablet-computing device in multiple orientations. In some cases, the cover may have one or more retaining mechanisms, such as a recess, Velcro™, a magnet, and/or a high-friction material that the rigid inner portion and/or a portion of the cover interfaces with. This allows the tablet-computing device to be propped up at a variety of different angles and yet be stable enough so that it can be used as desired.

Figure 1B:
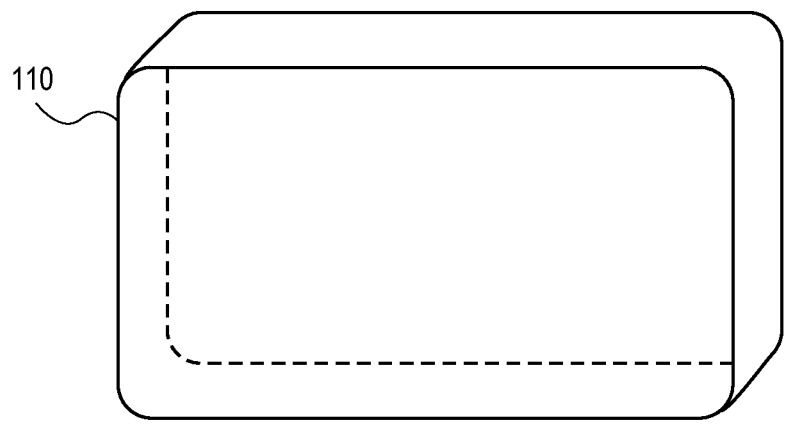
FIG. 1B is a top perspective view of an exemplary rigid inner portion in accordance with embodiments of the present invention.

FIG. 1A is top view and FIG. 1B is a top perspective view of a rigid inner portion 110 or chassis for enclosing and remaining attached to a tablet-computing device. Rigid inner portion 110 may be manufactured from any suitable material, such as, for example, a plastic, a metal, a hard rubber, an elastomeric material, wood, a composite, latex, and/or some combination thereof.

Rigid inner portion 110 may be shaped to accept and retain an inserted tablet-computing device. In some embodiments, a tablet-computing device may be inserted into rigid inner portion 110 and held in place via any conventionally available means such as, but not limited to, a clip, an overhanging extension, a magnet, or a strap.

Figure 1C:
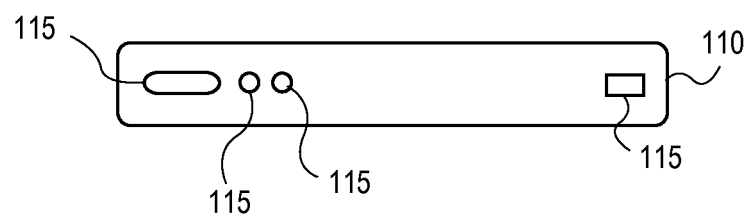
FIG. 1C is a side view an exemplary rigid inner portion in accordance with embodiments of the present invention.

In some embodiments, rigid inner portion 110 may be customized to accommodate a particular kind or type of tablet-computing device and rigid inner portion 110 may include an aperture 115 aligned within the case to accommodate a feature of the inserted tablet-computing device, such as, but not limited to, a user interface or a port as shown in FIG. 1C which is a side view of rigid inner portion 110.

Figure 2A:
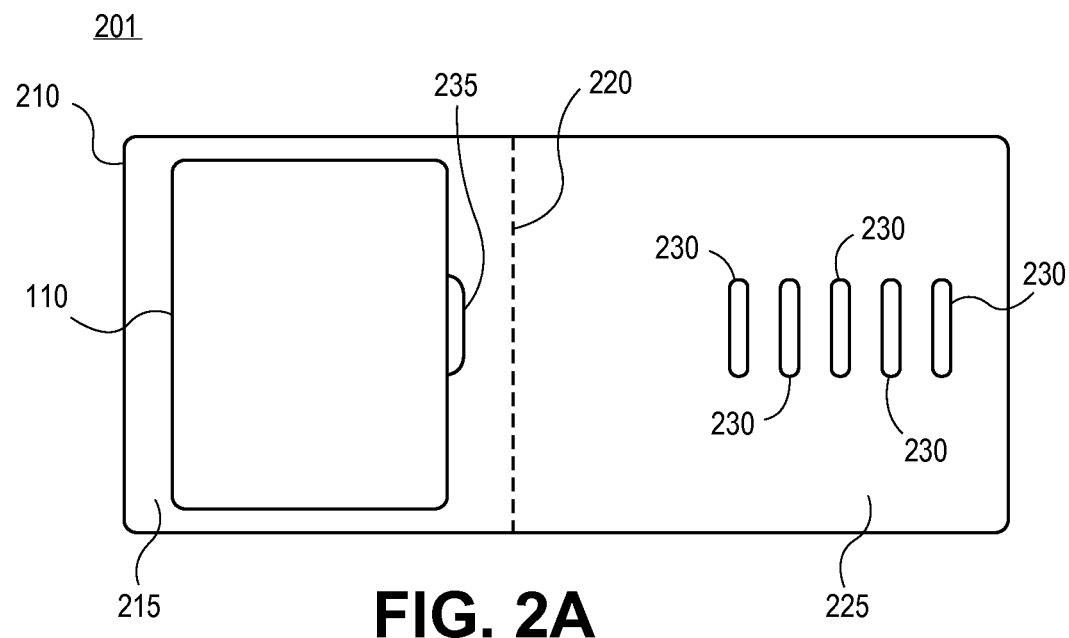
FIG. 2A is a top view of an exemplary outer portion of an exemplary case in accordance with embodiments of the present invention.

FIG. 2A is a top view of an outer portion 210 of an exemplary case 201 for enclosing and remaining attached to a tablet-computing device. Case 201 includes rigid inner portion 110 attached to a first section 215 of case 201 via any conventional means and, in some embodiments, may be removably attached to first section 215. First section 215 may be shaped to cover a backside of rigid inner portion 110. Second section 225 may be shaped to cover the inserted tablet-computing device and connected to first section 215 via a flexible junction 220. Exemplary flexible junctions 220 include a flexible portion of case 201, a hinge, a fold in case 201, or any other appropriate means.

Optionally, rigid inner portion 110 may include an attachment mechanism 235 sized to be inserted into or attached to one or more retaining mechanisms 230 located on second section 225. Exemplary attachment mechanisms 235 may include an extension of the material used to fabricate rigid inner portion 110 and/or a material affixed to rigid inner portion 110, such as Velcro™, a magnet, a high-friction material, or an adhesive material. Exemplary retaining mechanisms 230 may be sized to accommodate attachment and/or insertion of attachment mechanism 235 and/or may be made from a material compatible with attachment mechanism 235 (e.g., Velcro™, a magnet, and/or a material designed to be compatible with adhesive properties of attachment mechanism 235). In some embodiments, retaining mechanism 230 and/or attachment mechanism 235 may be covered and/or hidden by, for example, a covering folded over and/or attached to retaining mechanism 230 and/or attachment mechanism 235, respectively.

Figure 2B:
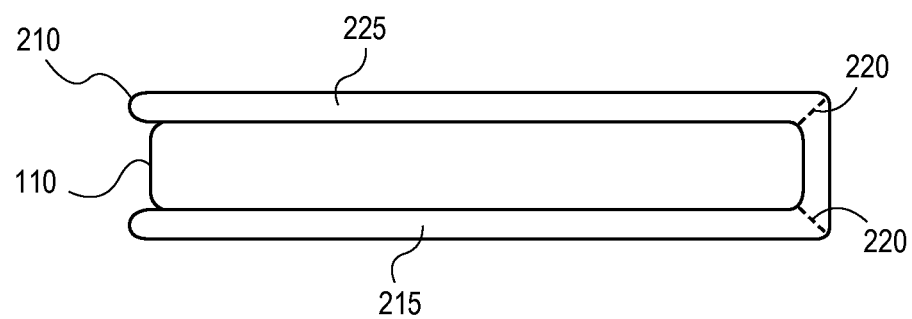
FIG. 2B is a side view of an exemplary outer portion of an exemplary case in accordance with embodiments of the present invention.

FIG. 2B is a side view of exemplary case 301 wherein second portion 225 of outer portion 310 is folded over on top of rigid inner portion 110. The exemplary case 201 of FIG. 2B also includes first portion 215 and two flexible junctions 220.

Figure 3A:
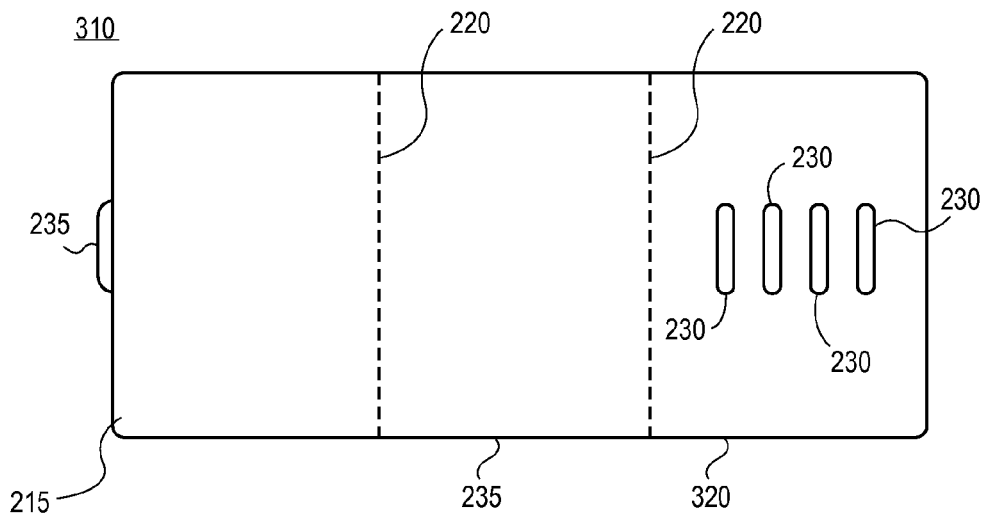
FIGS. 3A and 3B are top views of an outer portion of an exemplary case in accordance with embodiments of the present invention.
Figure 3B:
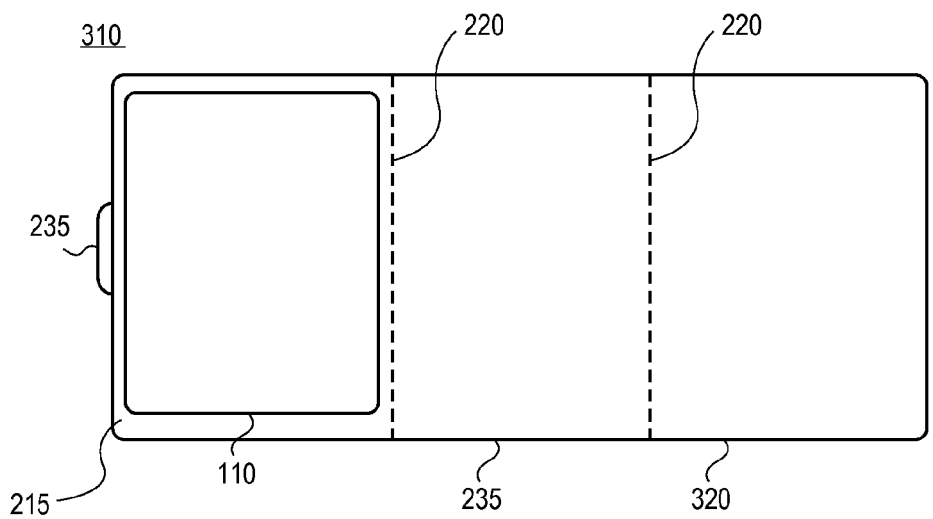

FIG. 3A is a top view of an outer portion 310 of an exemplary case 310 for enclosing and remaining attached to a tablet-computing device including first portion 215, second portion 225, a third portion 320, attachment mechanism 235, flexible junctions 220, and retaining mechanism 230. Rigid inner portion 110 is attached to the bottom side of outer portion 310 as shown in FIG. 3B. Attachment mechanism 235 is positioned on first portion 215 of outer portion 310 as opposed to being positioned on rigid inner portion 110 as with exemplary case 201.

Figure 3C:
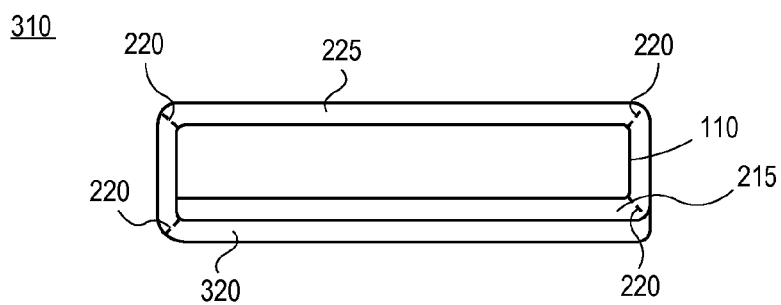
FIGS. 3C and 3D are side views of an exemplary case in accordance with embodiments of the present invention.
Figure 3D:
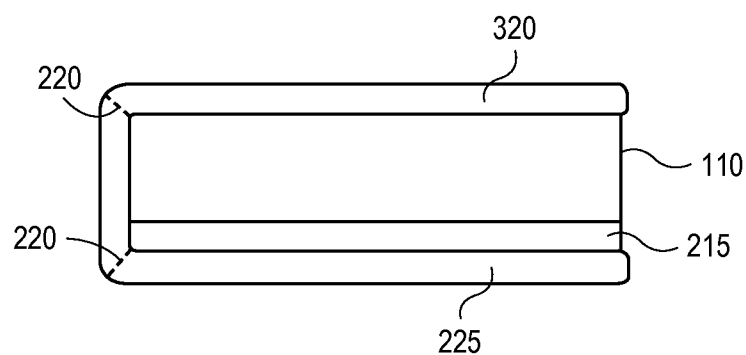

Exemplary case 310 may be folded closed in at least two ways as shown in FIGS. 3C and 3D, respectively. As shown in FIG. 3C, first section 215 is attached to the bottom of rigid inner portion 110, second portion 225 is folded over the top of rigid inner portion 110, and third portion 320 is folded over first portion 215 in a tri-fold manner. As shown in FIG. 3D, first section 215 is attached to the bottom of rigid inner portion 110, second portion 225 is folded over the top of rigid inner portion 110, and third portion 320 is folded over the top of rigid inner portion 110.

Figures 4A, 4B:
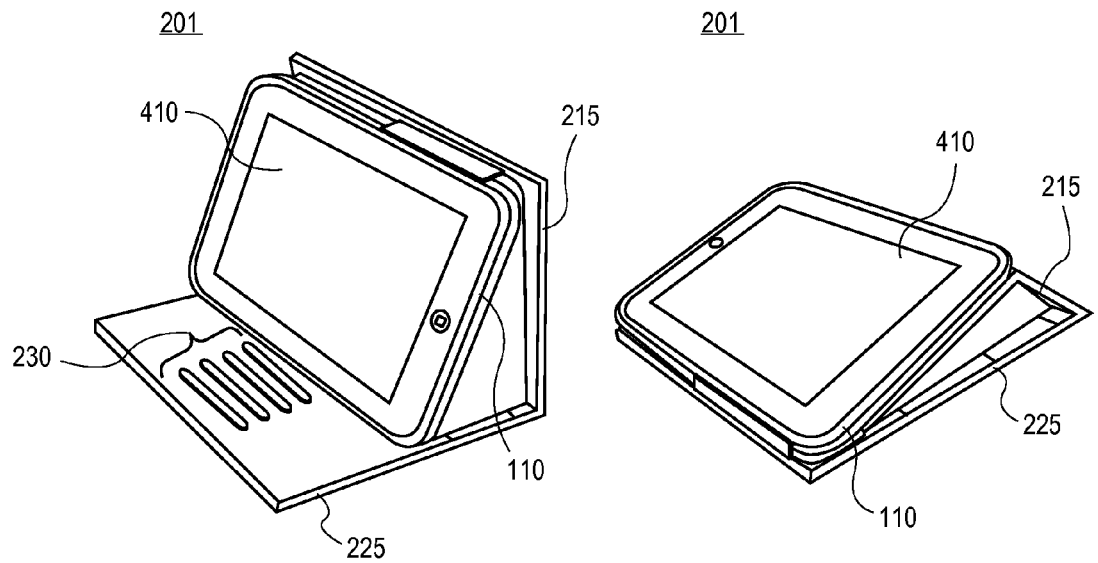

FIG. 4A is a side perspective view of exemplary case 201 for enclosing and remaining attached to a tablet-computing device 410. Exemplary tablet-computing devices 410 include a mobile communication device, an iPad™, a Kindle™ as distributed by Amazon, and a Nook™ as distributed by Barnes and Noble. As shown, attachment mechanism 235 is positioned on rigid inner portion 110 and inserted into and/or attached to retaining mechanism 230 so that tablet-computing device 410 is elevated at a first angled position relative to a planar position and/or maintained in the first angled position. Maintaining tablet-computing device 410 in the first angled position may be advantageous when, for example, viewing media displayed on tablet-computing device 410.

FIG. 4B is a side perspective view of exemplary case 201 for enclosing and remaining attached to tablet-computing device 410. As shown, attachment mechanism 235 is positioned on rigid inner portion 110 and inserted into and/or attached to retaining mechanism 230 so that tablet-computing device 410 is elevated at a second angled position relative to a planar position and/or maintained in the second angled position. Maintaining tablet-computing device 410 in the second angled position may be advantageous when, for example, entering data into tablet-computing device 410.

Figures 5A, 5B:
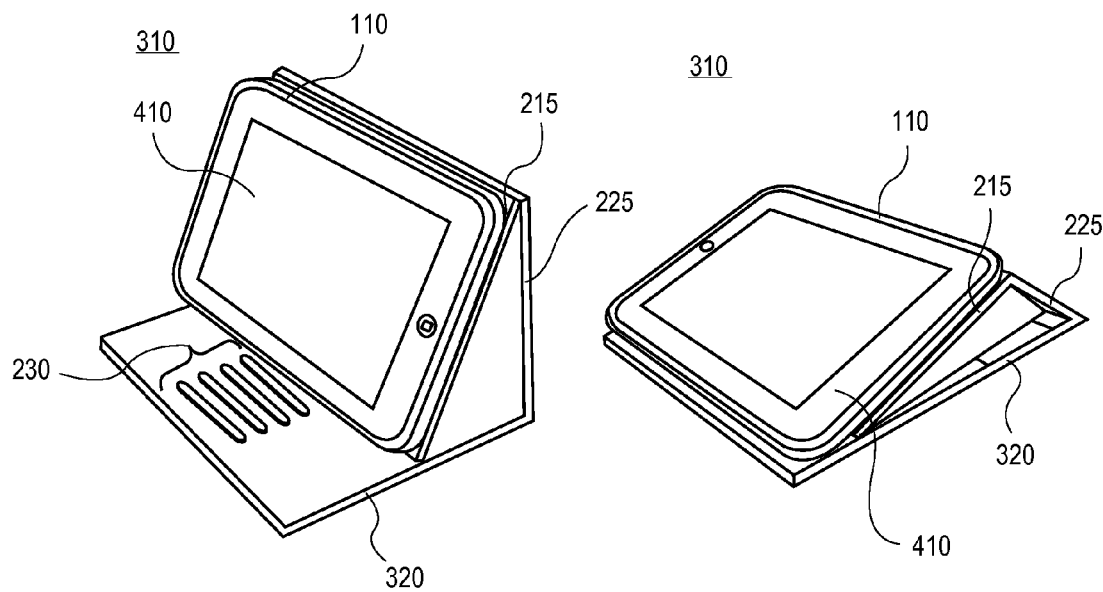

FIG. 5A is a side perspective view of exemplary case 301 for enclosing and remaining attached to tablet-computing device 410. As shown, attachment mechanism 235 is positioned on first portion 215 and inserted into and/or attached to retaining mechanism 230 so that tablet-computing device 410 is elevated at a first angled position relative to a planar position and/or maintained in the first angled position. Maintaining tablet-computing device 410 in the first angled position may be advantageous when, for example, viewing media displayed on tablet-computing device 410.

FIG. 5B is a side perspective view of exemplary case 301 for enclosing and remaining attached to tablet-computing device 410. As shown, attachment mechanism 235 is positioned on first portion 215 and inserted into and/or attached to retaining mechanism 230 so that tablet-computing device 410 is elevated at a second angled position relative to a planar position and/or maintained in the second angled position.

Maintaining tablet-computing device 410 in the second angled position may be advantageous when, for example, entering data into tablet-computing device 410.

Thus, a case for enclosing and remaining attached to a tablet-computing device that includes a rigid inner portion and an outer portion attached thereto has been herein described.

What is claimed is:

1. A case for enclosing and remaining attached to a tablet-computing device comprising: a rigid inner portion shaped to accept and retain the tablet-computing device when inserted therein; and an outer portion attached to the rigid inner portion, the outer portion including a first section and a second section, the first section being attached to and shaped to cover a backside of the rigid inner portion, the second section being shaped to cover the inserted tablet-computing device and connected to the first section via a flexible junction, wherein the rigid inner portion is attached to the first section via a flexible junction, the second section includes a retaining mechanism, and the rigid inner portion includes an attachment mechanism for attaching to the retaining mechanism thereby elevating the tablet-computing device at an angled position relative to a planar position and maintaining the tablet-computing device at the angled position.

2. The case of claim 1, wherein thn rigid inner portion includes a cut away portion sized and positioned to accommodate at least one of a user interface and a port included within the inserted tablet-computing device.

3. The case of claim 1, wherein the rigid inner portion is removably Attached to the outer portion.

4. The case of claim 1, wherein the outer portion includes a third section connected to the first section via a flexible junction, the third section includes a retaining mechanism and the first section includes an attachment mechanism for attaching to the retaining mechanism thereby elevating the tablet-computing device at an angled position relative to a planar position and maintaining the tablet-computing device at the angled position.

5. The case of claim 1, wherein a material comprising the outer portion is at least one of plastic, rubber, fabric, leather, cardboard, metal, and some combination thereof.

6. The case of claim 1, wherein the case is customized to accommodate a particular type of tablet-computing device.

7. The case of claim 1, wherein the case includes at least one aperture aligned within the case to accommodate a feature of the inserted tablet-computing device.

8. The case of claim 1, wherein a material comprising the rigid inner portion is at least one of a plastic, a metal, latex, wood, an elastomeric material, a composite, and rubber.

* * * * *